United States Patent [19]

Mueller et al.

[11] Patent Number: 5,214,643
[45] Date of Patent: May 25, 1993

[54] METHOD FOR INSERTING AN ASYNCHRONOUS 139,264 KBIT/S SIGNAL INTO A 155,520 KBIT/S SIGNAL

[75] Inventors: Horst Mueller, Hohenschaeftlarn; Pirmin Foerg, Grafing, both of Fed. Rep. of Germany

[73] Assignee: Siemens Aktiengesellschaft, Munich, Fed. Rep. of Germany

[21] Appl. No.: 339,302

[22] Filed: Apr. 17, 1989

[30] Foreign Application Priority Data

May 11, 1988 [DE] Fed. Rep. of Germany ....... 3816235

[51] Int. Cl.$^5$ .............................................. H04J 3/22
[52] U.S. Cl. ..................................... 370/84; 370/99; 370/102
[58] Field of Search ...................... 370/84, 102, 105.1, 370/99, 110.1, 111, 112, 79

[56] References Cited

U.S. PATENT DOCUMENTS

| | | | |
|---|---|---|---|
| 4,484,327 | 11/1984 | Hanson | 370/84 |
| 4,538,286 | 8/1985 | McNesby et al. | 370/84 |
| 4,594,708 | 6/1986 | Servel et al. | 370/94.2 |
| 4,752,923 | 6/1988 | Allen et al. | 370/84 |
| 4,807,221 | 2/1989 | Stummer | 370/102 |
| 4,862,480 | 8/1989 | Gupta | 370/84 |
| 4,924,459 | 5/1990 | Angell et al. | 370/84 |
| 4,949,339 | 8/1990 | Shimach et al. | 370/112 |

OTHER PUBLICATIONS

Recommendation G. 754 entitled "Fourth Order Digital Multiplex Equipment Operating At 139,264 kbit/s and Using Positive/Zero/Negative Justification", pp. 167-169.
Recommendation G. 702, p. 17.
Recommendation G 701-G. 941, front cover page.
8273 Nachrichtentechnische Berichte (1987) Mai, Heft 4, Backnang, W. Germany, pp. 92-101.
8178 Data Communications 16 (1987) Dec., No. 13, New York, N.Y., pp. 64-68.
International Switching Symposium 1987, "Innovations in Switching Technology", Mar. 15-20, 1987, pp. 789-793.
Telecommunications, "Sonet: An International Standard", Mar. 1988, pp. 63-66.
International Telegraph and Telephone Consultative Committee, "Study Group XVIII—Contribution 113"*, Nov. 1987.

Primary Examiner—Douglas W. Olms
Assistant Examiner—Alpus H. Hsu
Attorney, Agent, or Firm—Hill, Steadman & Simpson

[57] ABSTRACT

A method for inserting an asynchronous 139,264 kbit/s signal into a 155,520 kbit/s signal interlaces an asynchronous 139,264 kbit/s signal from the European digital signal hierarchy into the frame structure of a 155,520 kbit/s signal STM-1 of a network node interface NNI. Bits that are compiled in the form of a virtual container VC-4 in a sub-frame are inserted into the frame structure, which sub-frame is composed of 9 sections each having respectively 261 sub-sections of 1 byte or, respectively, 8 bits each. The first sub-section is reserved for a path overhead (POH). The remaining 260 sub-sections are inventively subdivided into 20 blocks having a first part (W, X, Y, Z) of 1 byte for auxiliary signals and having a second part of 12 bytes composed of information bits (I). This method can be employed at a network node interface NNI in a synchronous digital hierarchy.

5 Claims, 1 Drawing Sheet

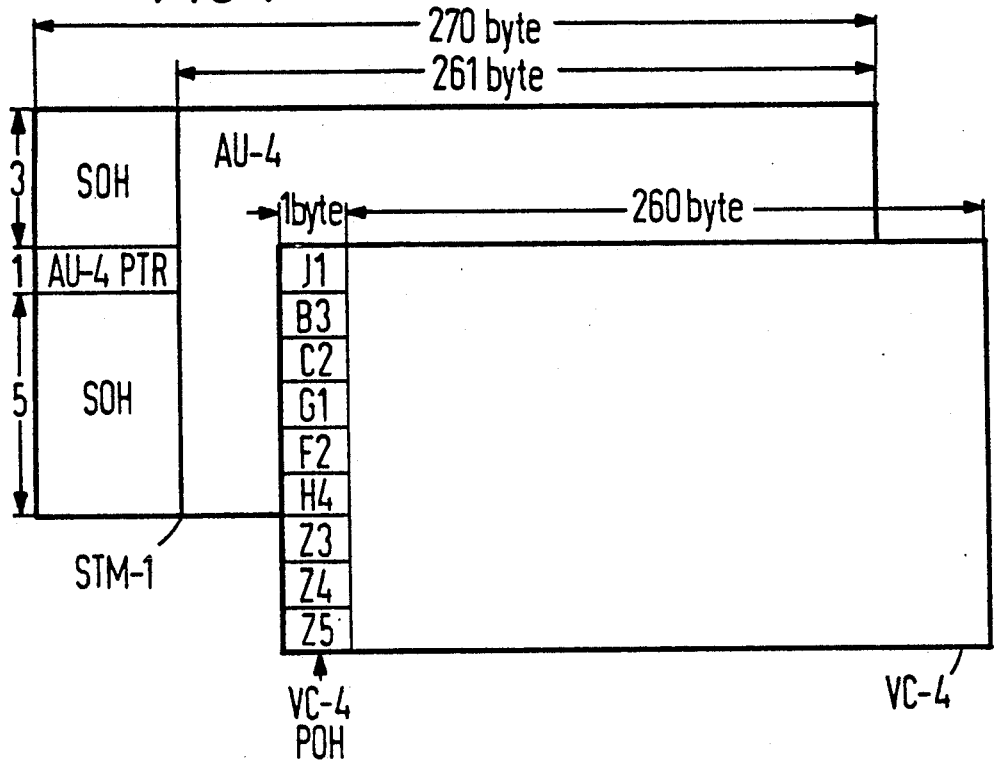
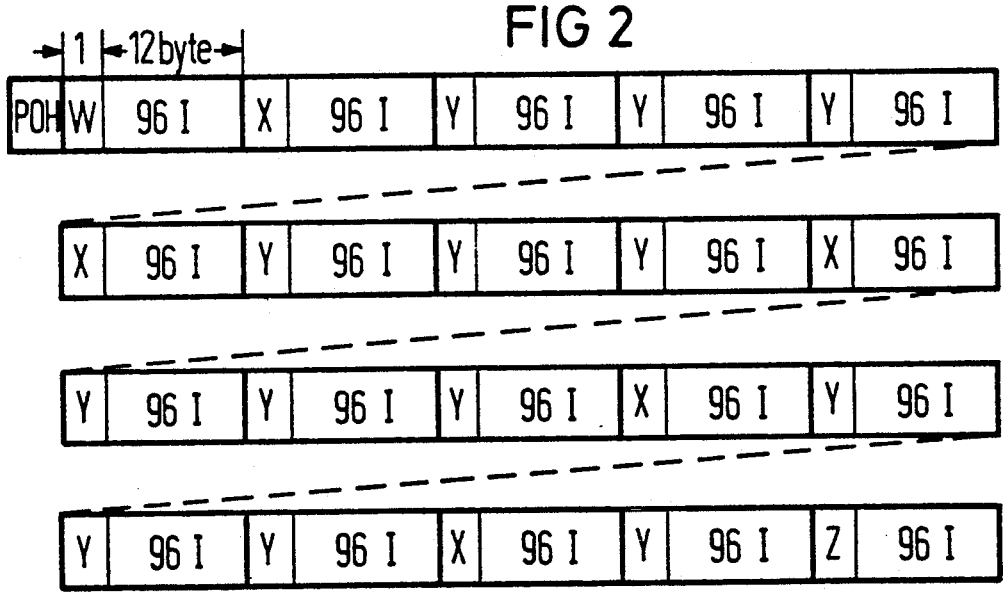

5,214,643

METHOD FOR INSERTING AN ASYNCHRONOUS 139,264 KBIT/S SIGNAL INTO A 155,520 KBIT/S SIGNAL

BACKGROUND OF THE INVENTION

The invention is directed to a method for inserting an asynchronous 139,264 kbits/s signal according to CCITT recommendation G.754 into the pulse frame of a 155,520 kbit/s signal according to the CCITT recommendations G.707, G.708 and G.709 having a virtual container composed of 9 series each of which first contains 1 byte for a route header and a following, further 260 bytes.

The periodical "Telecommunications", March 1988, pages 63, 65 and 66 describes a synchronous optical network SONET having network node interfaces NNI for international use. This system operates with a hierarchy of digital signals STM-1 having a byte rate of 155,520 kbit/s, STM-4 having a byte rate of 622,080 kbit/s and potentially further digital signals such as STM-8, STM-12 and STM-16. A pulse frame is allocated to each of these digital signals. Digital signals having a lower byte rate of the European, the Japanese or the US hierarchy can be inserted into the pulse frame of the digital signal STM-1.

SUMMARY OF THE INVENTION

FIG. 1 shows the pulse frame of the digital signal STM-1 comprising a section overhead SOH, an administration unit AU-4 and an administration unit pointer AU-4. The pulse frame is composed of 9 series or rows that are not arranged successively but under one another in a buffer memory for reasons of space saving and is composed of 270 columns, each of which encompasses respectively 1 byte or 8 bits per row. The section overhead SOH and the administration unit pointer AU-4 PTR occupy the first 9 columns.

Virtual containers VC-4 are inserted into the administration unit AU-4, the start of these virtual containers within the administration unit AU-4 specifying the administration unit pointer AU-4 PTR. The virtual container VC-4 contains the same number of rows and columns as the administration unit AU-4. A first column that is 1 byte wide serves for the acceptance of a path overhead POH with the bytes I1, B3, C2, G1, F2, H4, Z3, Z4 and Z5. Then, 260 bytes follow this column in every row.

It is an object of the invention to specify a method with which an asynchronous 139,264 kbit/s signal of the European hierarchy can be inserted into the virtual container VC-4.

This object is achieved by the present invention.

BRIEF DESCRIPTION OF THE DRAWINGS

Reference will now be made to the drawings, in which:

FIG. 1 illustrates the structure of the pulse frame of the digital signal and of a virtual container; and FIG. 2 illustrates the structure of one row of the virtual container of FIG. 1.

DESCRIPTION OF THE PREFERRED EMBODIMENT

The frame of the SYNCHRONOUS DIGITAL HIERARCHY makes 260 bytes·8=2080 bits available per row.

For the transmission of the 139,264 kbit/s signal, $$\frac{139{,}264 \cdot 10^3}{8\text{ kHz} \cdot 9\text{ rows}} = 1{,}934.2\overline{2}\ldots$$

bits per row are required.

Given a division of these 1,934.22 into 20 blocks, $$\frac{1934.2\overline{2}\ldots}{20} = 96.7\overline{1}\ldots$$

bits make up every block.

When 96 bits of useful information are transmitted in every second part of the blocks, then the remaining $14.2\overline{2}\ldots$ bits $(1{,}934.2\overline{2}\ldots - 96\cdot 20 = 14.2\overline{2}\ldots$ bits) must be accommodated in the first parts of the blocks. A space of 8 bits in the first part W and 6 bits in the first part Z are provided for this purpose. The remaining $0.2\overline{2}\ldots$ bits of useful information are accommodated at the location of the bit S in the first part of the block Z with the assistance of a justification method. A positive justification method with the nominal justification ratio $S = 0.7\overline{7}\ldots$ thereby derives.

$$f = \frac{\text{number of actual justification opportunities}}{\text{number of maximally possible justification opportunities}}$$

Given the maximally allowable frequency deviation $\Delta f/f = \pm 15$ ppm of the 139,264 kbit/s signal, the relative justification ratio varies from 0.749 through 0.807. The waiting time jitter is slight in this range, dependent on the circuit-oriented realization.

As a consequence of the distribution of the auxiliary signals into the first parts W, X, Y and Z, this solution offers the advantage that only one buffer memory having the capacity of 1 byte is required for the auxiliary signals. The uniform distribution of the five justification control bits C makes the justification control insensitive to noise bursts. The employment of only one possible justification bit S per row yields insensitivity to bit slips that would require a re-synchronization at the reception side.

The invention shall be set forth in greater detail with reference to FIG. 2. This shows a row of the virtual container VC-4 of FIG. 1. The row begins with 1 byte of the path overhead. The further 260 bytes are divided into 20 blocks each of which contains a first part of 1 byte and a second part of 12 bytes. The first parts are referenced W, X, Y or Z.

It is shown at the bottom in FIG. 2 that a first part W contains 8 information bits I, a first part X contains 1 justification control bit C, 5 fixed justification bits R and 2 freely available message information bits M, a first part Y contains 8 fixed justification bits R and a first part Z contains 6 information bits I, 1 possible justification bit S and 1 fixed justification bit R. Every second part of a block serves for the acceptance of 96 information bits I.

The justification control bits C are uniformly distributed over the row. When all have a status of logical "1", then the possible justification bit S is in fact a justification bit. When, by contrast, all 5 justification bit control bits C have a logical status of "0", then an information bit I is being transmitted instead of the possible justification bit S.

It will be understood that variations and modifications may be effected without departing from the spirit and scope of the novel concepts of the present invention.

It is claimed:

1. A method of assembling data for a digital network by inserting an asynchronous 139,264 kbit/s signal into a pulse frame of a 155,250 kbit/s signal (STM-1) with a transport-module (STM-1) composed of 9 rows of signal bit stream, each containing, first, 9 bytes for a section head (SOH) or for a pointer (AU-4 PTR) and subsequently, a further 261 bytes for an administration unit (AU-4), said administration unit incorporating a virtual container (VC-4) composed of 9 rows, each of which rows contains, first, 1 byte for a path overhead and, subsequently, a further 260 bytes, comprising the steps of subdividing said further 260 bytes into 20 blocks of 13 bytes each; every block being subdivided into a first part having 1 byte or, respectively, 8 bits, and into a second part having 12 bytes or, respectively, 96 bits;

assigning bits to the bytes of said first parts so that the first part (W) of the first block comprises respectively 8 information bits (I); the first part (X) of the second, 6th, 10th, 14th and 18th blocks each comprises 1 justification control bit (C), 5 fixed justification bits (R) and 2 freely available message information bits (M); the first part (Y) of the 3rd through 5th, 7th through 9th, 11th through 13th, 15th through 17th and 19th blocks comprise respectively 8 fixed justification bits (R); and the first part (Z) of the 20th block comprises respectively 6 information bits (I), 1 possible justification bit (S) and 1 fixed justification bit (R);

and assigning bits to the bytes of said second part of all blocks each comprises respectively 96 information bits (I).

2. The method according to claim 1, including the steps of filling all 5 justification control bits (C) of a row with the status of logical "0" when an information bit (I) is being transmitted instead of the possible justification bit (S); and filling all 5 justification control bits (C) in a row with the status of logical "1" when the possible justification bit (S) is in fact a justification bit.

3. A method of assembling data for a digital network by inserting an asynchronous 139,264 kbit/s signal into a pulse frame of a 155,520 kbit/s signal (STM-1) with a transport-module (STM-1) composed of 9 rows of signal bit stream each containing, first, 9 bytes for a section head (SOH) or for a pointer (AU-4 PTR) and subsequently a further 261 bytes for an administration unit (AU-4), said administration frame incorporating a virtual container (VC-4) composed of 9 rows, each of which rows contains first one byte for path overhead, and a subsequent 260 bytes in each of said 9 rows, comprising the steps of taking said 260 bytes for each of said 9 rows successively from the sequence: $1W+96I$, $1X+96I$, $3(1Y+96I)$, $1X+96I$, $3(1Y+96I)$, $1X+96I$, $3(1Y+96I)$, $1X+96I$, $3(1Y+96I)$, $1X+96I$, $1Y+96I$, $1Z+96I$, where I and W represent information bits, and X, Y and Z designate bits which are at least partially independent of the information bits.

4. The method according to claim 3, wherein X=CRRRRRMM, Y=RRRRRRRR, Z=IIIIIISR, where R and C are control and justifications bits, respectively, identify justification bits, M designates message information bits, and S designates a further justification bit.

5. The method according to claim 4, including the steps of filling all 5 justification control bits (C) of a row with the status of logical "0" when an information bit (I) is being transmitted instead of the possible justification bit (S); and filling all 5 justification control bits (C) in a row with the status of logical "1" when the possible justification bit (S) is in fact a justification bit.

* * * * *